United States Patent Office 3,514,398
Patented May 26, 1970

3,514,398
METHOD OF FLOCCULATING AND COAGULATING SUSPENDED SOLID PARTICULATE MATTER IN AN AQUEOUS MEDIUM
Raymond J. Schaper, Pittsburgh, Pa., assignor, by mesne assignments, to Calgon Corporation, a corporation of Delaware
No Drawing. Filed Aug. 27, 1965, Ser. No. 483,322
Int. Cl. B01d *21/01;* C02b *1/20*
U.S. Cl. 210—54          8 Claims

ABSTRACT OF THE DISCLOSURE

A method is disclosed of flocculating suspended matter in an aqueous medium by adding thereto a small amount of a copolymer of acrylamide and diallyl amine or quaternary ammonium compound having condensed on the nitrogen thereof through a Michael addition reaction a compound having an activated double bond and an electron-withdrawing (activating) group.

---

This invention relates to the flocculation of suspended particulate matter from an aqueous medium through the use of certain copolymers of acrylamide and diallyl amines or diallyl ammonium compounds. In particular, it relates to sewage flocculation and filtration.

Huge quantities of water are needed by modern industry to perform a wide range of functions. The oil producing industry uses water for secondary recovery of crude oil from partially depleted reservoirs. Water is used by a great many industries as a cooling medium and as a conductor of heat in the form of steam. The paper, coal, steel, and chemical industries all use large quantities of water.

Most of this water must be obtained from rivers, stream, or lakes. Usually it contains appreciable concentrations of suspended solids; as such, it is generally not useable, but must be clarified. Clarification is accomplished by flocculating the suspended solids. For example, aluminum or iron salts may be added to form insoluble gelatinous hydroxides which carry the solid particles down as a floc. A coagulant aid may also be added to make the floc form faster and be bigger, more compact, and denser in order that it settle faster.

The copolymers of my invention may be used to flocculate the solid particulate matter from water; they may also be used as coagulant aids. The copolymers of this invention are comparable in effectiveness, ease of handling, and cost to many of the flocculants and coagulant aids now sold commercially.

Sewage flocculation and filtration is a particularly useful application of the copolymers of this invention.

In a sewage plant raw sewage is admitted into a large primary settling basin where the solids are permitted to settle to the bottom forming a sludge. The primary effluent can go to a secondary settling basin, to an activated sludge basin, to a trickle filter, or to a stream.

The raw sludge from the primary and/or secondary settling basins may be collected and dewatered by a vacuum filter, may go to an activated sludge basin, or may go directly to a digester where bacterial action reduces it to a digested sludge. The activated sludge may be filtered and sent to the digester, or it may go directly to the digester. The sludge formed by the trickle filter unit is also sent to the digester. The digested sludge is dewatered, usually by drawing over a vacuum filter, leaving a relatively dry cake which is discarded.

Thus, settling takes place in the primary, secondary, and activated settling basins. Wherever settling takes place it is frequently desirable to add a flocculant and possibly a coagulant aid to cause the solids to settle faster by aggregating finely divided or colloidal particles into larger particles.

In addition to standard inorganic flocculants, various polymers have also been used to flocculate sewage in settling basins. See, for example, Suen U.S. Pat. 3,171,805. However, the polymers of the Suen patent require uneconomical treatment levels.

The copolymers of this invention may be used at very low concentrations (generally less than one percent based on solids) to flocculate sewage, and they are as effective as most commercial sewage flocculants.

Raw, primary, secondary, activated, and digested sewage sludge may be filtered to reduce its water content. Before it is filtered, it is preferable to add a filter aid to it. The function of a filter aid is to decrease the compressibility of the filter cake so that it will have a high solids content (low moisture) and be formed as quickly as possible in order that a maximum amount of sludge may be filtered. A compound that will function well as a flocculant will not necessarily function well as a filter aid and vice versa. See, for example, page 81 of the 1964 publication of "Sludge Concentration, Filtration, and Incineration" by the University of Michigan School of Public Health.

The filter aids in widest use today are inorganic compositions including alum, lime, ferrous sulfate, ferric sulfate, and ferric chloride. The lime, although it is cheap, is very dusty and difficult to handle. It also tends to form a scale on the filter which means that the filter must be periodically shut down and cleaned with acid. The metal salts used as filter aids are corrosive to the filter equipment. The metal salts-lime filter aids must be used in relatively large quantities in order to be effective, and must be prepared in relatively large tanks, usually a tank for the lime and another tank for the metal salts, where slurries for feeding are formed. It is difficult to control the feeding of the proper amounts of lime and metal salts. If the proper concentrations of lime and metal salts are not fed into the digested sludge, the conditioned sludge will be too wet to be picked up by the filter and the whole procedure must be repeated from the beginning. The filter cake formed by a metal salts-lime filter aid tends to be very sticky thereby making cleaning difficult.

The copolymers of this invention are excellent sewage filter aids, in fact, they are the best filter aids available. These copolymers are used in very small amounts and therefore only a small feed tank is needed; existing facilities are usually adequate. They are easy to handle and feed rates can be controlled more accurately. They are noncorrosive and do not form scale; in fact, after a few days of operation, they will clean up scale which has been left by the previous use of a metal salts-lime filter aid. The filter cake formed by these copolymers is larger, denser, and not sticky, thus making cleaning easier; the total cost for filtering a given amount of sludge is comparable to ferric chloride-lime treatment. Most important, use of the copolymers of this invention enables a sewage plant to handle more sludge or the same amount of sludge in a substantially lessened time than it is possible to by previous methods.

The copolymers of this invention may also find application in other processes involving solids sludge conditioning other than sewage prior to separation from process liquors such as ore beneficiation, recovery of paper mill pulping liquors, and the like.

The diallyl nitrogen compounds used in forming the copolymers of this invention have the following structures:

I.
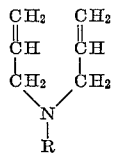

and

II.
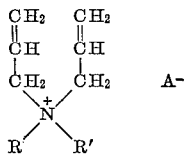

The R adduct in I and II is a group derived from condensing a vinyl type activated double bond compound of the general formula

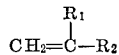

through a Michael addition reaction with diallyl amine, where $R_2$ is an electron-withdrawing (activating) group specifically defined below. In II, R' may be R, H, —CH$_3$, —CH$_2$—CH$_3$, —CH$_2$OH, —CH$_2$CH$_2$OH, and

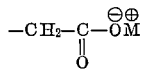

$R_1$ is H or —CH$_3$ and A$^-$ is a related noninterfering anion, such as halide, methosulfate, hydroxide, etc. M is H, alkali metal or alkaline earth metal. As is known in the art, a Michael reaction is the addition of an active hydrogen across an activated double bond. In the case of diallyl amine, it would be

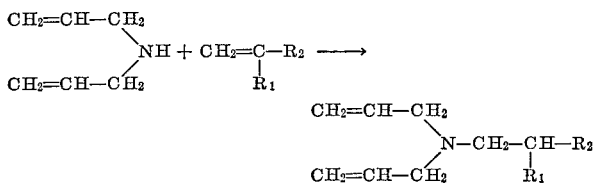

forming a tertiary amine.

In the general formula

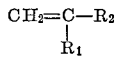

used in defining R in I and II $R_2$ may be more specifically defined as being

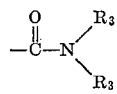

—C≡N, or

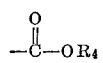

where each $R_3$ is independently chosen from H, alkyl up to 4 carbon atoms, alkanol up to 4 carbon atoms, or dialkyl amino alkyl where each alkyl group contains up to 4 carbon atoms and is independently selected, and $R_4$ is alkyl up to 4 carbon atoms, alkanol up to 4 carbon atoms, or dialkyl amino alkyl where each alkyl contains up to 4 carbon atoms and is independently selected.

Examples of vinyl type activated double bond compounds of the general formula

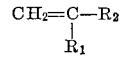

where $R_2$ is an electron-withdrawing (activating) group include acrylamide, acrylonitrile, methacrylamide, methacrylonitrile( N,N-dialkyl acrylamides, N,N-dialkyl methacrylamides, N-alkanol acrylamides, N-alkanol methacrylamides, N,N-(dialkyl amino alkyl) acrylamides, N,N-(dialkyl amino alkyl) methacrylamides, alkyl acrylates to $C_4$, alkyl methacrylates to $C_4$, dialkyl amino alkyl acrylates, and dialkyl amino alkyl methacrylates.

The tertiary diallyl amines used in our invention (I) can be prepared by condensation of the above-mentioned vinyl type activated double bond compounds with diallyl amine.

The quaternized version (II) can be prepared by reacting the unquaternized version (I) with a quaternizing agent such as dialkyl sulfates, ethylene oxide, the alkyl halides, chloroacetate, etc. A few of the simpler quaternized diallyl amines may also be prepared by reacting an aqueous diallyl solution with two moles of an alkyl chloride. For a detailed account of the preparation of these diallyl monomers, see Hoover et al. applications S.N. 458,753 entitled "Novel Monomers and Polymers Derived Therefrom, and Flocculation with Said Polymers" filed May 25, 1965, now U.S. Pat. No. 3,412,019.

Polymerization is effected through techniques well-known in the art. For a detailed account of the copolymerization of acrylamide and these diallyl amines and diallyl ammonium compounds, see Hoover et al. application S.N. 472,011 entitled "Copolymer Composition" filed July 14, 1965, and now abandoned. The polymers of this invention include copolymers of acrylamide and diallyl amines in both the quaternized and unquaternized form in the same polymer. In this case, the R adduct need not be the same in both the quaternized and unquaternized forms. Indeed, R, R' and A$^-$ need not be the same in any case, as a mixture is contemplated by this invention also, whether or not the polymer contains both quaternized and unquaternized versions.

This invention contemplates copolymers of acrylamide and the specified diallyl compounds in any range from about 0.1% to 99.9% acrylamide to about 0.1% to 99.9% diallyl compound. However, copolymers containing about 25% to 75% acrylamide and about 25% to 75% diallyl compound make the best flocculants and filter aids. There is a synergistic effect between the acrylamide and the diallyl compounds; that is, a copolymer of acrylamide and the specified diallyl compounds is a more effective flocculant than is an equal amount of polyacrylamide or a polymer of the diallyl compounds by itself; the maximum synergism is in the 25% to 75% range.

A copolymer of acrylamide and diallyl methyl (β-propionamido) ammonium halide is preferred for sewage flocculation and filtration and general use in solids-liquid separation processes.

Numerous experiments have been performed which demonstrate the flocculating and filter aid characteristics of the copolymers of this invention. In these experiments a copolymer or a commercial sewage flocculant was added to a sewage sample where it flocculated the solid matter. The sample was immediately poured into a Buchner funnel under a 15″ vacuum, and the time required for a dry cake to form was recorded.

Compounds which can rapidly form a dry cake under these conditions are generally effective flocculants or filter aids in commercial sewage plants since similar conditions are encountered there. The following table gives the results of these experiments. UCAR C–149, Separan C-120, and Cat-Floc are commercial flocculants (as are Dow's 601 and 602 which appear in subsequent tables).

DIGESTED SEWAGE DRY FILTER CAKE TIME (sec.)

| Sample | 8% X sewage sample conc. at 250 p.p.m. | 8% X sewage sample conc. at 125 p.p.m. | 4% Y sewage sample conc. at 250 p.p.m. |
|---|---|---|---|
| Copolymer of 50% acrylamide and 50% diallyl methyl (β-propionamido) ammonium chloride | 48 | 63 | 40 |
| Copolymer of 75% acrylamide and 25% diallyl methyl (β-propionamido) ammonium chloride | 50 | 80 | 55 |
| UCAR C-149 | 85 | 90 | 50 |
| Separan C-120 | 92 | 120 | 55 |
| Cat-Floc | 95 | 120 | 80 |
| Control (0 p.p.m.) | 420 | 420 | 240 |

Other experiments were also conducted in a similar fashion upon another sewage sample. The results of these experiments are presented in the following table; some figures represent averages of many tests.

DIGESTED SEWAGE (7.5% SOLIDS) DRY FILTER CAKE TIME (sec.)

| Sample | Sample concentration (p.p.m.) | | | | |
|---|---|---|---|---|---|
| | 350 | 300 | 250 | 200 | 150 |
| Copolymer of 50% acrylamide and 50% methyl (β-propionamido) diallyl ammonium chloride | 30 | 34 | 48 | 40 | 60 |
| Copolymer of 75% acrylamide and 25% methyl (β-propionamido) diallyl ammonium chloride | | 35 | 50 | | |
| UCAR C-149 | 45 | 50 | 85 | | |
| Cat-Floc | | 85 | 95 | 90 | 120 |
| Dow's 602 | | | 90 | | |

(This sludge could not be practically dewatered when no filter aid was added.)

A copolymer of 50% acrylamide and 50% methyl (β-methylpropionato) ammonium methosulfate required 30 sec. at 1,000 p.p.m. and 40 sec. at 750 p.p.m. to form a dry filter cake on the above sewage sample. A standard sewage flocculant consisting of 2,000 p.p.m. FeCl$_3$ and 7,000 p.p.m. lime required 600 sec. to form a dry filter cake on this sewage sample, and this same flocculant at twice these concentrations required 90 sec.

The following results were obtained from similar experiments on a different sewage sample:

DIGESTED SEWAGE (6.5% SOLIDS) DRY FILTER CAKE TIME (sec.)

| Sample | Sample concentration (p.p.m.) | | | |
|---|---|---|---|---|
| | 350 | 300 | 250 | 200 |
| Copolymer of 50% acrylamide and 50% methyl (β-propionamido) diallyl ammonium chloride | 45 | 48 | 41 | 30 |
| Copolymer of 25% acrylamide and 75% methyl (β-propionamido) diallyl ammonium chloride | | | 65 | |
| Copolymer of 75% acrylamide and 25% methyl (β-propionamido) diallyl ammonium chloride | | | 55 | 90 |
| UCAR C-149 | 60 | 90 | 240 | |
| Dow's 601 | | | 50 | 55 |

(This sludge could not be practically dewatered when no filter aid was added.)

Thus, it can be seen that the copolymers of this invention generally performed much better than the commercial flocculants. A commercial operation is very similar to this laboratory procedure, and it has been found that corresponding results may be expected in a large scale sewage system operation. The following is a description of the use of one of the copolymers of this invention in such an operation.

A municipal sewage plant was filtering an 8½% solids content sewage sludge over a coil spring filter under a 13″ vacuum. The 2% ferric chloride-7% lime filter aid being used produced a ⅛″ to ½″ filter cake. Use of this filter aid was terminated and 335 to 350 p.p.m. of a copolymer of 50% acrylamide and 50% methyl (β-propionamido) diallyl ammonium chloride was maintained in the filter sludge. A ½″ to ¾″ filter cake having 17% solids content was produced which was dry enough to handle. Only a very small percentage of the solids content of this cake consisted of copolymer; under previous treatment about 5% of the solids content consisted of ferric chloride and lime. Most important, the amount of sewage sludge which could be filtered in a given period of time was double that filtered using the ferric chloride-lime filter aid.

While a minute amount of copolymer will flocculate some suspended particulate matter, the amount of polymer needed to clarify a specific water sample depends on many factors, such as particle concentration, particle size, particle charge, the presence of other interfering chemicals, etc. Without knowing these factors, it is difficult to predict the exact amount of copolymer necessary to clarify a given water system without adding excess polymer. Ordinary river water would usually not require more than about 10 p.p.m., while sewage water might require as much as 500 p.p.m. and industrial waste as much as 2,000 p.p.m. The most one can say is that sufficient copolymer should be added to clarify the water, without adding so much as to waste copolymer, this amount being dependent upon the various characteristics of the medium being clarified. However, it may be said that sewage flocculation usually requires a much lower concentration than does sewage filtration; a range of about 0.1 p.p.m. to 2,000 p.p.m. is generally suitable for sewage applications, and about 100 to 500 p.p.m. is the preferred range.

Thus it will be seen that my invention relates to flocculation with copolymers of acrylamide and certain diallyl nitrogen compounds; particularly, it relates to sewage flocculation and filtration.

I do not intend to be limited to the specific compounds, copolymers, and methods disclosed herein for illustrative purposes. My invention may be otherwise practiced and embodied within the scope of the following claims.

I claim:

1. A method of flocculating and coagulating suspended solid particulate matter in an aqueous medium comprising adding thereto a copolymer of acrylamide and diallyl ammonium compound of the general formula $$\begin{array}{c} CH_2=CH-CH_2 \\ \phantom{CH_2=CH-} \diagdown \\ \phantom{CH_2=CH-CH} \overset{+}{N} \phantom{-} A^- \\ \phantom{CH_2=CH-} \diagup \diagdown \\ CH_2=CH-CH_2 \phantom{-} R' \end{array} \phantom{-} \begin{array}{c} R \end{array}$$

where R is a group derived from condensing a vinyl type activated double bond compound of the general formula $$CH_2=\underset{\underset{R_2}{|}}{\overset{\overset{R_1}{|}}{C}}$$

through a Michael addition reaction with diallyl amine, $R_2$ is an electron-withdrawing (activating) group, and R' is selected from the group consisting of R, H, —$CH_3$, —$CH_2$—$CH_3$, —$CH_2OH$, —$CH_2CH_2OH$, and $$-CH_2-\underset{\underset{O}{\|}}{C}-\overset{\ominus\oplus}{OM}, A^-$$

is a related noninterfering anion, M is selected from the group consisting of H, alkali metal, and alkaline earth metal, and $R_1$ is selected from the group consisting of H and —$CH_3$.

2. A method of flocculating and coagulating suspended solid particulate matter in an aqueous medium comprising adding thereto a copolymer of acrylamide and diallyl compound of the general formulas $$\begin{array}{c} CH_2=CH-CH_2 \\ \phantom{CH_2=CH-} \diagdown \\ \phantom{CH_2=CH-CH_2} N-R \\ \phantom{CH_2=CH-} \diagup \\ CH_2=CH-CH_2 \end{array}$$

and $$\begin{array}{c} CH_2=CH-CH_2 \phantom{-} R \\ \phantom{CH_2=CH-} \diagdown \diagup \\ \phantom{CH_2=CH-CH} \overset{+}{N} \phantom{-} A^- \\ \phantom{CH_2=CH-} \diagup \diagdown \\ CH_2=CH-CH_2 \phantom{-} R' \end{array}$$

where R is a group derived from condensing a vinyl type activated double bond compound of the general formula

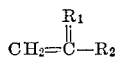

through a Michael addition reaction with diallyl amine, R' is selected from the group consisting of R, H, —CH$_3$, —CH$_2$—CH$_3$, —CH$_2$OH, —CH$_2$CH$_2$OH, and

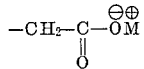

R$_1$ is selected from the group consisting of H and —CH$_3$, R$_2$ is selected from the group consisting of —C≡N,

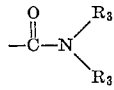

and

each R$_3$ is independently selected from the group consisting of H, alkyl up to 4 carbon atoms, alkanol up to 4 carbon atoms, and dialkyl amino alkyl where each alkyl contains up to 4 carbon atoms and is independently selected, R$_4$ is selected from the group consisting of alkyl up to 4 carbon atoms, alkanol up to 4 carbon atoms, and dialkyl amino alkyl where each alkyl contains up to 4 carbon atoms and is independently selected, A$^-$ is a related noninterfering anion, and M is selected from the group consisting of H, alkali metal, and alkaline earth metal.

3. A method of flocculating and coagulating suspended solid particulate matter in an aqueous medium comprising adding thereto a copolymer of acrylamide and diallyl methyl (β-propionamido) ammonium halide.

4. A method of flocculating and coagulating suspended solid particulate matter in sewage comprising adding thereto a copolymer of acrylamide and diallyl ammonium compound of the general formula

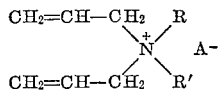

where R is a group derived from condensing a vinyl type activated double bond compound of the general formula

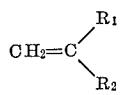

through a Michael addition reaction with diallyl amine, R' is selected from the group consisting of R, H, —CH$_3$, —CH$_2$CH$_3$, —CH$_2$OH, —CH$_2$CH$_2$OH, and

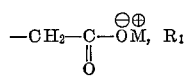

is selected from the group consisting of H and —CH$_3$, R$_2$ is selected from the group consisting of

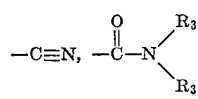

and

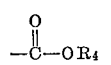

each R$_3$ is independently selected from the group consisting of H, alkyl up to 4 carbon atoms, alkanol up to 4 carbon atoms, and dialkyl amino alkyl where each alkyl contains up to 4 carbon atoms and is independently selected, R$_4$ is selected from the group consisting of alkyl up to 4 carbon atoms, alkanol up to 4 carbon atoms, and dialkyl amino alkyl where each alkyl contains up to 4 carbon atoms and is independently selected, A$^-$ is a related noninterfering anion, and M is selected from the group consisting of H, alkali metal, and alkaline earth metal.

5. A method of treating sewage sludge to cause it to rapidly form a thick, high solids content filter cake upon filtration comprising adding to said sludge a copolymer of acrylamide and diallyl ammonium compound of the general formula

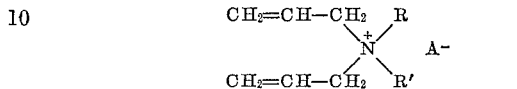

where R is a group derived from condensing a vinyl type activated double bond compound of the general formula

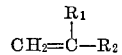

through a Michael addition reaction with diallyl amine, R$_2$ is an electron-withdrawing (activating) group, and R' is selected from the group consisting of R, H, —CH$_3$, —CH$_2$, —CH$_3$, —CH$_2$OH, —CH$_2$CH$_2$OH, and

A$^-$ is a related noninterfering anion, M is selected from the group consisting of H, alkali metal, and alkaline earth metal, and R$_1$ is selected from the group consisting of H and —CH$_3$.

6. A method of treating sewage sludge to cause it to rapidly form a thick, high solids content filter cake upon filtration comprising adding to said sludge a copolymer of acrylamide and diallyl ammonium compound of the general formula

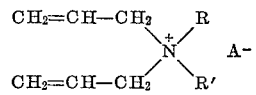

where R is a group derived from condensing a vinyl type activated double bond compound of the general formula

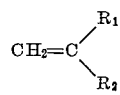

through a Michael addition reaction with diallyl amine, R' is selected from the group consisting of R, H, —CH$_3$, —CH$_2$CH$_3$, —CH$_2$OH, —CH$_2$CH$_2$OH, and

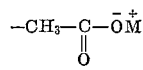

R$_1$ is selected from the group consisting of H and —CH$_3$, R$_2$ is selected from the group consisting of —C≡N

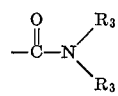

and

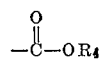

each R$_3$ is independently selected from the group consisting of H, alkyl up to 4 carbon atoms, alkanol up to 4 carbon atoms, and dialkyl amino alkyl where each alkyl contains up to 4 carbon atoms and is independently selected, R$_4$ is selected from the group consisting of alkyl up to 4 carbon atoms, alkanol up to 4 carbon atoms, and dialkyl amino alkyl where each alkyl contains up to 4 carbon atoms and is independently selected, A$^-$ is a related noninterfering anion, and M is selected from the group consisting of H, alkali metal, and alkaline earth metal.

7. A method of treating sewage sludge to cause it to rapidly form a thick, high solids content filter cake upon filtration comprising adding to said sludge a copolymer of acrylamide and diallyl methyl ($\beta$-propionamido) ammonium halide.

8. The method of claim 7 where the percentage of acrylamide in said copolymer is about 25% to 75% and the percentage of diallyl methyl ($\beta$-propionamido) ammonium halide is about 25% to 75%.

References Cited

UNITED STATES PATENTS

| 2,923,701 | 2/1960 | Schuller et al. | 260—85.5 |
| 2,926,161 | 2/1960 | Butler et al. | 260—89.7 |
| 3,171,805 | 3/1965 | Suen et al. | 210—54 |
| 3,288,770 | 11/1966 | Butler | 260—88.3 |
| 3,412,019 | 11/1968 | Hoover et al. | 210—54 |

MICHAEL E. ROGERS, Primary Examiner

U.S. Cl. X.R.

210—10; 260—85.5, 88.3